2,900,362

SUBSTITUTED XYLENOLS AS RUBBER ANTIOXIDANTS

Ronald B. Spacht, Franklin Township, Portage County, Ohio, assignor to The Goodyear Tire & Rubber Company, Akron, Ohio, a corporation of Ohio No Drawing. Application December 8, 1955
Serial No. 551,739

6 Claims. (Cl. 260—45.95)

This invention relates to a new class of age resistors for organic compositions subject to deterioration due to oxidation, particularly rubber.

Rubber is subject to deterioration from many sources such as sunlight, ozone, atmospheric oxygen, presence of heavy metals, etc. Both cured and uncured natural and synthetic elastomers are subject to deterioration. Deterioration in cured stock may likewise vary with the type of stock, the state of cure, the amount of surface exposed and the temperature at which the rubber is being used. An ideal antioxidant would protect rubber from deterioration of any kind, in the cured or uncured state, and no matter where used. Since no such antioxidant has been discovered, compromises must be made in the selection of an antioxidant for use in rubber.

Certain alkylated phenols have been found to be effective antioxidants. While many of these phenols display antioxidant activity, there is a great difference between phenols in their effectiveness as age resistors. The effectiveness of a phenolic antioxidant will vary with the type of groups present and the location of the substituent groups. Furthermore, the vapor pressure of the phenolic molecule is of particular importance for certain uses, i.e., for high temperature uses and for uses wherein large rubber surfaces are exposed. Again compromises may have to be made. A good antioxidant may be too volatile for general usage while on the other hand, a non-volatile material may be a poor antioxidant.

According to the present invention, a class of phenols has been discovered which exhibit unusual and unexpected antioxidant activity, and which are relatively non-volatile. They exhibit a high degree of protection for rubber against sunchecking and against atmospheric oxygen. They are derived from cheap raw materials and hence possess an economic advantage over most antioxidants of this general class.

In the practice of this invention, it has been discovered that certain alkylated xylenols which have been substituted with certain alkylation provide compositions which display new and unexpected antioxidant activity. For example, it has been discovered that 2,4-xylenols, 2,5-xylenols and 3,4-xylenols, when reacted with a composition selected from styrene, vinyl toluene and alphamethyl styrene, display superior antioxidant properties, whereas inferior antioxidants result from the reaction of 2,6-xylenol or 3,5-xylenol with the same alkylating compositions. This result, proved by tests, is unexpected in view of the fact that heavy alkylation in both positions ortho to the hydroxyl is generally considered necessary in a good phenolic antioxidant.

Although the indicated xylenols are preferred in the practice of this invention, the remaining xylenols will exhibit some antioxidant activity when reacted with the indicated compounds to introduce benzyl radicals and for that reason need not be removed from the antioxidant mixtures. In fact, commercial mixed xylenols are customarily used as the starting materials. Preferably, these mixed xylenols contain from about 70% to about 80% 2,4-xylenol and from about 30% to about 20% of 2,5-xylenol and almost always traces of the various other xylenols. Thus, the preferred compositions of this invention are the products of reaction of mixed xylenols with at least one of the compounds selected from the group consisting of styrene, vinyl toluene and alphamethyl styrene.

The compositions of this invention can be described as xylenols selected from the group consisting of 2,4-xylenol, 2,5-xylenol and 3,4-xylenol, having from one to two aralkyl substituents attached to the xylenol ring, said aralkyl substituents being selected from the group consisting of alphaphenylethyl, alphatolylethyl and alpha-methyl-alphaphenylethyl.

These new antioxidant compositions can further be defined with reference to the following structural formula

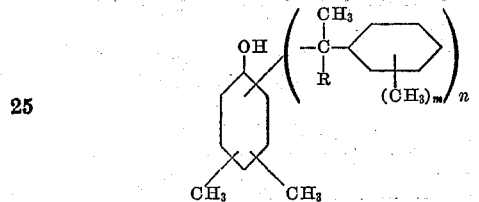

wherein R is selected from the group consisting of H and CH$_3$; m is selected from 0 and 1; n is selected from 1 and 2; and wherein the two methyl substituents on the phenolic ring are in the positions selected from the group consisting of 2,4; 2,5; and 3,4.

The preferred reaction can be illustrated with the following structural equation

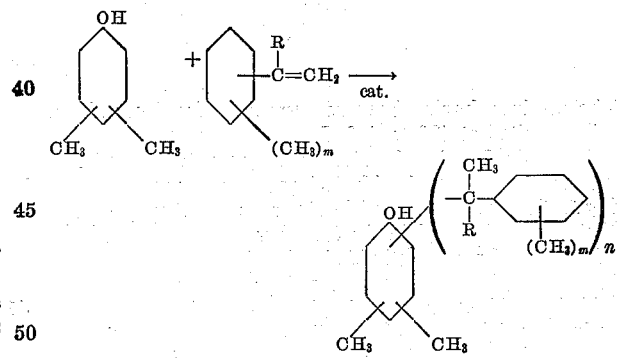

wherein R is selected from the group consisting of H and CH$_3$; m is selected from 0 and 1 and n is selected from 1 and 2.

In the customary practice of this invention, not less than one mol and not more than two mols of benzyl compound will be reacted with one or more of the preferred xylenols. The best antioxidants appear to be those substituted xylenols wherein one and preferably two of the positions ortho to the hydroxyl are substituted with the benzyl radical. When one of the methyl groups of the xylene nucleus is in the ortho position an effective antioxidant results from substituting the other ortho position, although a better antioxidant results when both the remaining ortho and para positions are substituted with the benzyl radicals. Such tribenzyl substitution as may occur when mixed xylenols are used as the starting material is minor in amount and does no appreciably affect the age-resisting properties of the product.

In the practice of the invention, one or more of the customary acidic alkylation catalysts is used to activate and accelerate the reactions. For example, alkane sulfonic acids, ethyl sulfonic acid, sulfuric acid, benzene sulfonic acid, toluene sulfonic acid, activated clays, stannic chloride, ferrous chloride, boron trifluoride, zinc chloride, the ferrous and ferric halides, the stannous and stannic halides, aluminum halide and aluminum oxide will activate the reactions. Usually, concentrated sulfuric acid is used as the alkylation catalyst. The catalyst will ordinarily be used in an amount of at least 0.5% of the total weight of reactants in order to obtain proper action. Larger amounts of catalyst, for example up to 5.0% by weight of the reactants, are satisfactory.

Although the conditions of reaction may vary greatly, depending on the compositions being reacted and other factors such as pressure, the temperature will ordinarily be maintained within a range of 50° C. to 200° C. during the alkylation process. Although the reaction will proceed at temperatures below 50° C., perhaps down to normal room temperature, if the temperature is much below 50° C. alkylation proceeds rather slowly and if the temperature rises to much above 200° C. the customary alkylation catalysts may reverse their roll and become catalysts for de-alkylation.

The preparation of the products of this invention is further illustrated by the following examples which are not intended as limitative:

*Example 1.*—One hundred twenty-two grams of 2,4-xylenol and 1.0 gram of sulfuric acid were heated to 90° C. and thereafter 104 grams of styrene were added while the temperature was maintained between 90 and 120° C. The reaction mixture was then stirred for two hours, after which the catalyst was neutralized and the reaction product distilled from the mixture at a temperature of 140° to 153° C. at 4 millimeters' pressure. The yield was 87% of the theoretical yield of monoalphaphenylethyl,2,4-xylenol, having the formula:

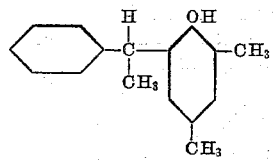

The product, having been recrystallized from petroleum ether, melted at 42° to 44° C.

*Example 2.*—One hundred twenty-two grams of 3,4-xylenol were reacted with 104 grams of styrene according to the procedure used in Example 1. After purification, the reaction yielded 84% of the theoretical amount of monoalphaphenylethyl,3,4-xylenol.

*Example 3.*—Two hundred eight grams of styrene were added to 122 grams of 3,4-xylenol according to the procedure used in Example 1. Distillation and purification gave a yield of 94%, based on the theoretical yield, of 2,6-dialphaphenylethyl,3,4-xylenol.

The efficacy of this invention has been further demonstrated by testing the antioxidant properties in a standard rubber formulation comprised as follows:

| | |
|---|---|
| Extracted pale crepe | 100.0 |
| ZnO | 5.0 |
| Sulfur | 3.0 |
| Hexamethylene tetramine | 1.0 |
| Stearic acid | 1.5 |
| Antioxidant | 1.0 |

As shown in the following tables antioxidant efficiency is measured by aging samples of rubber containing the antioxidants for 18 days in an oxygen bomb at 50° C. and under 150 pounds pressure. Tensile retention and weight increase are used as measures of efficiency of the antioxidants.

TABLE I

| Cure—50 minutes at 285° F. | Test Data—O₂ Bomb 50° C.—150 p.s.i. | |
|---|---|---|
| | Percent Tensile Retention | Percent Weight Increase |
| Control—no antioxidant | 0 | 19.2 |
| Control—Antioxidant A [1] | 41.5 | 1.22 |
| 6-alphaphenylethyl-3,4-xylenol | 70.7 | 0.69 |
| 6-alphaphenylethyl-2,4-xylenol | 78.8 | 0.22 |
| Alphaphenylethyl-2,5-xylenol | 66.7 | 0.40 |
| R.P. of styrene and a mixture of 2,4 and 2,5-xylenol | 51.9 | 0.49 |
| Dialphaphenylethyl-3,4-xylenol | 58.8 | 0.97 |

[1] Antioxidant A is a commercial mixture of alkylated phenols.

Reference to the above table thus illustrates that the preferred products of this invention display new and unexpected antioxidant activity.

Further tests were conducted to establish that the products of this invention, while effective age-resistors, are nonstaining and nondiscoloring. Representative products of the invention were compounded in a white rubber formula containing natural rubber, sulfur, zinc oxide, calcium carbonate, stearic acid, and antioxidant in the proportion of one part antioxidant to 100 parts natural rubber. Identical test samples were exposed, one in a Weatherometer for 48 hours and another to the atmosphere for six days to induce staining and discoloration. The following table sets forth the obtained data and is based on a standard of 1 for no discernible discoloration to 10 for very severe discoloration:

TABLE II

*Discoloration data*

| | 48 Hours in Weatherometer | 6 Days on Roof |
|---|---|---|
| No antioxidant | 1 | 1 |
| Antioxidant A [1] | 4 | 6 |
| R.P. of styrene and a mixture of 2,4 and 2,5-xylenol | 2 | 2 |
| 6-alphaphenylethyl-2,4-xylenol | 2 | 2 |
| Dialphaphenylethyl-3,4-xylenol | 2 | 2 |

[1] Antioxidant A is a commercial mixture of alkylated diphenylamines.

The above table thus illustrates that the products of this invention display excellent nondiscoloring properties and can thus be classed as nonstaining antioxidants.

The products of this invention are useful as age resistors in both vulcanized and raw rubbers and both uses are within the scope of the specification and claims.

Use of the term "a rubber" is intended to include natural rubber and the various synthetic rubbers and rubber-like materials, e.g. polychloroprene, the polymerization products of a major proportion of a monoolefin, such as isobutylene, and a minor proportion of a poly-olefin, such as butadiene or isoprene, e.g. butyl rubber, the rubbery copolymers of butadiene and styrene, e.g. GRS, and the rubbery copolymers of butadiene and acrylonitrile, and the like.

While certain representative embodiments and details have been shown for the purpose of illustrating the invention, it will be apparent to those skilled in this art that various changes and modifications may be made therein without departing from the spirit or scope of the invention.

I claim:

1. A rubbery diolefin polymer composition treated with a xylenol selected from the group consisting of 2,4-xylenol, 2,5-xylenol and 3,4-xylenol, having from 1 to 2 aralkyl substituents attached to the xylenol ring, said aralkyl substituents being selected from the group consisting of alphaphenylethyl, alphatolylethyl, alphamethyl-alphaphenylethyl and alphamethyl-alphatolylethyl, the aralkyl substituents being attached to the xylenol ring in the ortho and para positions.

2. A rubbery diolefin polymer composition treated with 6-alphaphenylethyl, 3,4-xylenol.

3. A rubbery diolefin polymer composition treated with 6-alphaphenylethyl, 2,4-xylenol.

4. A rubber diolefin polymer treated with a substituted xylenol of the structure:

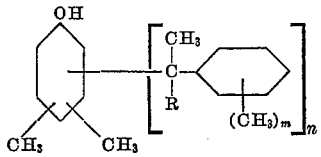

wherein R is selected from the group consisting of H and CH$_3$; wherein $m$ is an integer from 0 to 1; wherein $n$ is an integer from 1 to 2; wherein the two methyl substituents on the xylenol ring are substituted in one of the pairs of positions (2,4), (2,5), and (3,4), and wherein the aralkyl substituents are attached through the alkylene group to the xylenol ring in ortho or para positions not occupied by said methyl substituents.

5. A rubbery diolefin polymer as claimed in claim 4 wherein said xylenol is the reaction product of a mixture of xylenols wherein a substantial portion thereof is 2,4-xylenol and a material selected from the group consisting of styrene, vinyl toluene, α-methyl vinyl toluene, and α-methyl styrene.

6. A rubbery diolefin polymer as claimed in claim 4 wherein said xylenol is the reaction product of styrene and a mixture of 2,4 xylenol and 2,5 xylenol.

References Cited in the file of this patent
UNITED STATES PATENTS

| | | |
|---|---|---|
| 2,276,117 | Taylor et al. | Mar. 10, 1942 |
| 2,315,556 | Soday | Apr. 6, 1943 |
| 2,329,671 | Ward | Sept. 14, 1943 |
| 2,394,754 | D'Alelio | Feb. 12, 1946 |
| 2,647,152 | Kitchen | July 28, 1953 |
| 2,670,340 | Kehe | Feb. 23, 1954 |
| 2,730,436 | Young et al. | Jan. 10, 1956 |
| 2,755,272 | Lambert et al. | July 17, 1956 |

OTHER REFERENCES

Columbia Encyclopedia, 2nd ed., Columbia University Press (1950), page 2196, "Zero."